United States Patent Office 3,274,160
Patented Sept. 20, 1966

3,274,160
POLYURETHANES FROM A THREE COMPONENT PREPOLYMER
Konrad Ellegast, Leichlingen, and Artur Reischl and Erwin Müller, Leverkusen, Germany, assignors to Farbenfabriken Bayer Aktiengesellschaft, Leverkusen, Germany, a German corporation
No Drawing. Filed Aug. 29, 1961, Ser. No. 134,589
Claims priority, application Germany Sept. 2, 1960
9 Claims. (Cl. 260—77.5)

This invention relates to polyurethane plastics and more particularly to improved hard polyurethane castings which have improved mechanical properties.

It is well-known to prepare polyurethane castings by reacting an excess of an organic polyisocyanate in a first stage with a polyhydroxyl compound to prepare a prepolymer and then cross-linking the prepolymer in the second stage with a polyhydric alcohol. It has been known heretofore to make hard polyurethane castings by using the organic polyisocyanate in excess of from about 300 to 900 percent based on the hydroxyl groups of the polyhydroxyl compounds but the use of this large excess of diisocyanate makes the heat of the exothermic reaction difficult to control and indeed leads to thermal conditions creating cracks in the interior of castings. Furthermore, the casting time when a large excess of organic polyisocyanate is used is very short due to the rapidity of the reaction between the isocyanate groups and the alcoholic hydroxyl groups.

It has been suggested heretofore to mix or dissolve a part of the polyhydric alcohol used for cross-linking in the polyhydroxyl compound used to make the prepolymer and then react this mixture with a slight excess of organic polyisocyanate up to about 200 percent for convenience and to vary the properties of the polymer, but no real difference in processing has been found heretofore for using a mixture of, for example, a dihydric alcohol with the higher molecular weight polyol used to make the prepolymer.

It is therefore an object of this invention to provide an improved process for the preparation of improved polyurethane castings where a large excess of organic polyisocyanate is used. Another object of this invention is to provide improved hard polyurethane castings having a large volume. Still a further object of this invention is to provide an improved process for the preparation of polyurethane castings based on mixtures of organic cross-linking agents and polyhydroxyl compounds of higher molecular weight.

The foregoing objects and others which will become apparent from the following description are accomplished in accordance with the invention, generally speaking, by providing polyurethane castings prepared by reacting sufficient of an organic polyisocyanate with a mixture of an organic compound containing a plurality of alcoholic hydroxyl groups and having a molecular weight above about 800 and a polyhydric alcohol having a molecular weight below about 500 so that an excess of from about 300 percent of about 900 percent of organic polyisocyanate is present based on the hydroxyl groups of said organic compound containing a plurality of alcoholic hydroxyl groups, the amount of said polyhydric alcohol being only sufficient so that an excess of at least about 150 percent of the organic polyisocyanate remains after reaction of all of the free hydroxyl groups of both the polyhydric alcohol and the organic compound containing a plurality of alcoholic hydroxyl groups and having a molecular weight above about 800 to prepare a prepolymer which is then reacted in a second stage with additional polyhydric alcohol to bring about cross-linking and produce a hard elastic polyurethane casting. The percent excess referred to above, and throughout this application and in the claims, is calculated by dividing the number of equivalents of —NCO necessary to react with the equivalents of hydroxyl groups present in the compounds, on which the excess is based, into the total excess and multiplying the result by 100. For example, if 2 mols of a dihydric polyester are mixed with 2 mols of dihydric alcohol and then reacted with 10 mols of an organic diisocyanate in accordance with the process of the invention, the excess of organic polyisocyanate based on the dihydric polyester would be 400 percent and the excess of diisocyanate based on the mixture of polyester and dihydric alcohol would be 150 percent.

In accordance with a preferred embodiment of the invention and in order to obtain the optimum properties in the polyurethane casting, a trihydric alcohol having a molecular weight below about 500 such as, for example, trimethylolpropane, glycerine and the like is mixed with the organic compound containing a plurality of hydroxyl groups and having a molecular weight above about 800 and reacted with an organic polyisocyanate in the first stage and the resulting prepolymer is reacted with a dihydric alcohol in the second stage.

Any suitable polyhydric alcohol having a molecular weight below about 500 may be used, however, in either stage of the process of the invention such as, for example, ethylene glycol, 1,2-propylene glycol, 1,3-propylene glycol, 1,4-butanediol, 2,3-butanediol, 1,4-butenediol, 1,4-butynediol, 1,5-pentanediol, 1,6-hexanediol, hexene-3-diol-2,5, hexyne-3-diol-2,5, the bis-beta-hydroxyethyl ether of hydroquinone, pentaerythritol, thiodiglycol and the like as well as polyhydric alcohols which contain urea, urethane, carbonamide, ester groups and the like such as, for example, the reaction product of 2 mols of ethanol amine with 1 mol of 2,4-toluylene diisocyanate, the reaction product of 2 mols of ethylene glycol with 1 mol of 2,4-toluylene diisocyanate, the reaction product of 2 mols of ethanol amine with 1 mol of adipic acid, the reaction product of 2 mols of ethylene glycol with 1 mol of adipic acid and the like. As pointed out above, the polyhydric alcohols must have a molecular weight below about 500 and they should preferably contain from 2 to 4 alcoholic hydroxyl groups. Moreover, it is not necessary to use the same polyhydric alcohol in each step, but different polyhydric alcohols may be used in the first and second stages and indeed it is most preferred to react a trihydric alcohol with the organic polyisocyanate while it is mixed with an organic compound containing a plurality of alcoholic hydroxyl groups and having a molecular weight above about 800 at a temperature between about 80 and 150° C.

Any suitable organic compound containing a plurality of hydroxyl groups and having a molecular weight of at least about 800 may be used for reaction with the excess of organic polyisocyanate to prepare the prepolymer. A preferred type of organic compound having a molecular weight of at least 800 is one containing hydroxyl groups as the sole groups thereof which are reactive with —NCO groups. Such a compound suitable has the formula $R(OH)_n$ wherein R is a polyvalent organic radical having the valence $n$ and $n$ is 2 or 3. R may suitably be composed of the elements C, H, N, S and/or O. Among the suitable compounds are hydroxyl polyesters, polyhydric polyalkylene ethers, polyhydric polythioethers, polyacetals and the like. The preferred organic compounds have a molecular weight of from about 1000 to about 3000, hydroxyl numbers between about 30 and about 80 and acid numbers below about 2. Any suitable hydroxyl polyester may be used such as those obtained, for example, from a polycarboxylic acid and a polyhydric alcohol. Of course, the term "hydroxyl polyester" includes hydroxyl polyester amides which may be obtained from the above-defined ingredients with the addition of some organic amine or amino alcohol such as ethylene diamine, propylene diamine, ethanol amine and the like. Any suitable polyhydric alcohol may be used such as, for example, ethylene glycol, propylene glycol, 1,4-butanediol, trimethylolpropane, pentaerythritol and the like. Any suitable polycarboxylic acid may be used such as, for example, adipic acid, succinic acid, phthalic acid, terephthalic acid, 1,3,5-benzene tricarboxylic acid and the like.

Any suitable polyhydric polyalkylene ether may be used such as, for example, those obtained by the condensation of an alkylene oxide either alone or together with a polyhydric alcohol. Any suitable alkylene oxide may be used such as, for example, ethylene oxide, propylene oxide, butylene oxide, amylene oxide and the like as well as epihalohydrins such as epichlorohydrin and aralkylene oxides such as styrene oxide and the like. Any suitable polyhydric alcohol may be used such as those more particularly set forth above for use in the preparation of the polyester. It is preferred to use polyalkylene ether glycols such as, for example, polybutylene glycol, polypropylene glycol, polyethylene glycol and the like. The polyhydric polyalkylene ethers may be prepared by any suitable process such as that disclosed by Wurtz in 1859, Encyclopedia of Chemical Technology, volume 7, pages 257 to 262, published by Interscience Publishers, Inc. (1951), and in U.S. Patent 1,922,459.

Any suitable polyhydric polythioether may be used such as, for example, that obtained by the condensation of thiodiglycol with itself or with an alkylene oxide or polyhydric alcohol as set forth above.

Any suitable polyacetal may be used such as, for example, those obtained by condensing butanedioxyethyl glycol or diethylene glycol with formaldehyde.

Any suitable organic polyisocyanate may be used but it is preferred to employ an organic diisocyanate with the above-mentioned difunctional compounds so that a substantially linear prepolymer is obtained. Examples are, diphenylmethane-4,4'-diisocyanate, 2,4-toluylene diisocyanate, 2,6-toluylene diisocyanate, 1,5-naphthylene diisocyanate, hexamethylene diisocyanate, p-phenylene diisocyanate, m-phenylene diisocyanate, diphenyl sulphone-4,4'-diisocyanate, p,p',p''-triphenyl methane triisocyanate, furfurylidene diisocyanate and the like.

The process of this invention, by following the certain critical orders of addition and steps set forth in this specification, makes it possible to produce hard polyurethane elastomers which have improved mechanical properties and which can be processed in a much easier and more straightforward manner than heretofore possible. Certain things, however, are critical to the invention. The excess of organic polyisocyanate must be within the range set forth above, namely 300 percent to 900 percent excess of the organic polyisocyanate must be present based on the hydroxyl groups of the polyester, polyethers and the like and there must still be at least 150 percent excess organic polyisocyanate at the completion of the reaction in the first stage. The process of the invention is particularly important for the production of large castings because the problems of internal stress cracks and internal voids have been avoided. By large castings is meant those which have a minimum dimension in any direction through the center of the piece of 10 mm. or more. In other words, the disc having a diameter of 1 m. with a thickness of only 5 mm. is not a large casting. The problem encountered with large castings is that the exotherm of the reaction is such that thermal stresses are produced inside the casting and the limits on the cooling of the reaction are such that, due to the rise in viscosity, there is danger of excess diisocyanate crystallizing out of the reaction mixture and creating weak places in the final casting. By following the procedure of this invention, the heat, if necessary, can be adequately dissipated and yet a hard casting can be obtained which has all of the good mechanical properties of the heretofore known polyurethane castings including tensile strengths of 100 kg./cm.$^2$ and higher. These properties are maintained without lowering the hardness and elasticity of the product.

The castings of this invention are useful for the preparation of vehicle tires, gear wheels, clutch facings, and other articles where substantially good hardness, tensile strength and elasticity are necessary.

The invention is further illustrated but not limited by the following examples, in which parts and percentages are by weight unless otherwise specified.

*Example 1*

About 80 parts of trimethylolpropane are mixed with about 2000 parts of an anhydrous polyester of adipic acid and ethylene glycol (acid number less than about 1; OH number about 56) and the mixture is heated to about 145° C. About 1200 parts of naphthylene-1,5-diisocyanate are added at this temperature and allowed to react for about 10 minutes. The temperature falls initially to about 108° C. and then rises again to about 130° C. After the reaction, about 300 parts of butane-2,3-diol are stirred into the clear thinly liquid melt. The mass remains pourable for about 2½ minutes and is within this time poured into waxed one-piece wheel molds with a diameter of about 500 mm., and a width of about 120 mm. at a temperature of about 130° C. The molds can be emptied after about 30 minutes and after a final heating period of about 24 hours at about 110° C., a hard elastic one-piece wheel which has the following mechanical properties is obtained:

| | |
|---|---|
| Shore hardness A | 98 |
| Shore hardness D | 60 |
| Tensile strength kg./cm.$^2$ | 370 |
| Breaking elongation percent | 310 |
| Permanent elongation do | 40 |
| Load at 20% elongation kg./cm.$^2$ | 155 |
| Load at 300% elongation kg./cm.$^2$ | 360 |
| Elasticity percent | 30 |
| Resistance to further tearing kg./cm. | 80 |

*Example 1a*

Example 1 is repeated. Instead of the 80 parts of trimethylolpropane 80 parts of butane-2,3-diol are mixed with the polyester. After the reaction of naphthylene-1,5-diisocyanate instead of the 300 parts of butane-2,3-diol the remaining 220 parts of butane-2,3-diol are stirred into the liquid melt together with 80 parts of trimethylolpropane. In other words, the reaction conditions and the reaction components are completely the same as in Example 1, only the order of addition of the polyhydric alcohol has been changed. The mass now remains pourable only for about 60 sec. and has to be poured into molds within this time, which very often is too short for practical applications. A hard elastic one-piece wheel will be obtained, which in contrast to the wheel of Example 1 has a lower shore hardness D of only 57.

*Example 2*

About 100 parts of butane-2,3-diol are added to about 2000 parts of substantially anhydrous polyester obtained from adipic acid and ethylene glycol (OH number about 56). The mixture is heated to about 140° C. and thereafter about 1200 parts of naphthylene-1,5-diisocyanate are incorporated by stirring. After 10 minutes, a mixture of about 60 parts of trimethylolpropane with about 220 parts of butane-2,3-diol is incorporated into the melt by stirring, the temperature being about 130° C., and the homogeneous melt is poured into cylindrical molds with an inside dameter of about 150 mm. and heated to about 130° C. The solidified material can be removed from the molds after a few minutes and after a final heating period of about 24 hours at about 110° C., the articles show the following mechanical properties:

| | |
|---|---:|
| Shore hardness A | 98 |
| Shore hardness D | 61 |
| Tensile strength kg./cm.² | 270 |
| Breaking elongation percent | 250 |
| Permanent elongation do | 35 |
| Load at 20% elongation kg./cm.² | 180 |
| Elasticity percent | 30 |
| Resistance to further tearing kg./cm. | 85 |

A cylinder with a diameter of about 150 mm. and a height of about 100 mm. can be produced without any crack formation.

*Example 3*

About 20 parts of trimethylolpropane are mixed with about 2000 parts of a dehydrated polythioether of thiodiglycol (OH number about 56) and the mixture is reacted at about 120° C. with about 600 parts of naphthylene-1,5-diisocyanate. After a reaction period of about 10 minutes in vacuo, about 120 parts of butane-2,3-diol are stirred in and the thinly liquid clear melt is poured into waxed clutch facing molds heated to about 110° C. After about 15 minutes, the molded clutch facings are removed from the molds and then finally heated for about 24 hours in a heating chamber at about 110° C. The clutch facings have a diameter of about 120 mm., a thickness of about 16 mm. and have 6 holes bored in the facing with a diameter of 15 mm. each.

The product has the following physical properties after storage for about one week:

| | |
|---|---:|
| Shore hardness A | 92 |
| Shore hardness D | 36 |
| Tensile strength kg./cm.² | 240 |
| Breaking elongation percent | 350 |
| Permanent elongation do | 15 |
| Load at 20% elongation kg./cm.² | 60 |
| Load at 300% elongation kg./cm.² | 135 |
| Elasticity percent | 55 |
| Resistance to further tearing kg./cm. | 32 |

*Example 4*

About 60 parts of trimethylolpropane and about 100 parts of butane-2,3-diol are admixed with about 2000 parts of a substantially anhydrous polyester of adapic acid, ethylene glycol and butane-1,4-diol (OH number about 56; acid number less than about 1). About 1200 parts of naphthylene-1,5-diisocyanate are stirred into the mixture, which is at a temperature of about 120° C. The reaction, which is allowed to proceed under partial vacuum to assist removal of dissolved gas, lasts about 7 minutes.

Thereafter, about 220 parts of butane-2,3-diol are admixed and the composition is poured into hot doughnut shaped molds, for the preparation of solid tires for a 200 mm. diameter wheel. The tire has an outside diameter of about 220 mm., i.e. it is about 20 mm. thick, and a width of about 40 mm. The mechanical properties, after a final heating of 24 hours, are as follows:

| | |
|---|---:|
| Shore hardness A | 98 |
| Shore hardness D | 65 |
| Tensile strength kg./cm.² | 320 |
| Breaking elongation percent | 350 |
| Permanent elongation do | 35 |
| Load at 20% elongation kg./cm.² | 158 |
| Load at 300% elongation kg./cm.² | 305 |
| Elasticity percent | 25 |
| Resistance to further tearing kg./cm. | 80 |

It is to be understood that the foregoing working examples are given for the purpose of illustration and that any other suitable polyhydric alcohol, organic compound containing a plurality of alcoholic hydroxyl groups and having a molecular weight above about 500, organic polyisocyanate and the like can be used provided that the teachings of this disclosure are followed.

Although the invention has been described in considerable detail for the purpose of illustration, it is to be understood that variations can be made by those skilled in the art without departing from the spirit of the invention and the scope of the claims.

What is claimed is:

1. A process for the preparation of a polyurethane which comprises preparing a prepolymer by reacting an organic polyisocyanate with a mixture containing a polyhydric alcohol having at least two and not more than three hydroxyl groups and an organic compound having a plurality of alcoholic hydroxyl groups, said organic compound having a molecular weight above about 800 and selected from the group consisting of hydroxyl polyesters, polyhydric polyalkylene ethers, polyhydric polythioethers and polyacetals, said polyhydric alcohol having a molecular weight below about 500; the amount of said organic compound is such that an excess of from about 300 to about 900 percent of said polyisocyanate is present when calculated on the basis of the hydroxyl groups of said organic compound and is such that from about 150 to about 300 percent excess of said polyisocyanate is present after reaction with all the hydroxyl groups of said mixture containing said polyhydric alcohol and said organic compound and subsequently reacting said prepolymer with additional polyhydric alcohol to bring about crosslinking and produce a hard, elastic NCO terminated polyurethane casting by placing the final mixture into a mold and allowing it to cure.

2. The process of claim 1 wherein said organic compound is an hydroxyl polyester containing from two to three hydroxyl groups which is obtained by a process which comprises condensing a polyhydric alcohol with a polycarboxylic acid to a molecular weight within the range of from about 1,000 to about 3,000.

3. The process of claim 1 wherein said excess of organic polyisocyanate based on the hydroxyl groups of said organic compound having a molecular weight above about 800 is within the range of from about 300 percent to about 700 percent excess.

4. The process of claim 1 wherein said polyhydric alcohol is a trihydric alcohol in the first stage and said polyhydric alcohol in the second stage is a dihydric alcohol.

5. The process of claim 1 wherein said polyhydric alcohol employed in the first stage is trimethylolpropane and the polyhydric alcohol employed in the second stage is a butane diol.

6. The process of claim 1 wherein said organic polyisocyanate is an aromatic diisocyanate.

7. The process of claim 1 wherein the reaction in the first stage is carried out at a temperature within the range of from about 80° C. to about 150° C.

8. A process for the preparation of a polyurethane casting which comprises reacting from about 3.0 to about 9.0 equivalents of an organic polyisocyanate with a mixture of from about 0.5 to about 2.0 equivalents of a trihydric alcohol having a molecular weight below about 500 with about 1 equivalent of an hydroxyl polyester having a molecular weight above about 800 in a first stage in proportions such that an excess of from about 300 percent to about 900 percent of organic polyisocyanate is present based on the hydroxyl groups of said polyester and from about 150 to about 300 percent excess organic polyisocyanate is present based on the hydroxyl groups of the hydroxyl polyester and the trihydric alcohol to prepare a prepolymer and reacting said prepolymer in a second stage with from about 2.5 to about 6 equivalents of a dihydric alcohol to produce a hard elastic polyurethane casting.

9. The process of claim 8 wherein said trihydric alcohol is trimethylolpropane and said dihydric alcohol is butanediol.

References Cited by the Examiner

UNITED STATES PATENTS

| | | | |
|---|---|---|---|
| 2,621,166 | 12/1952 | Schmidt | 260—75 |
| 2,901,467 | 8/1959 | Croco | 260—77.5 |
| 2,929,794 | 3/1960 | Simon | 260—77.5 |
| 2,929,800 | 3/1960 | Hill | 260—77.5 |
| 3,129,200 | 4/1964 | Muller | 260—77.6 |

LEON J. BERCOVITZ, *Primary Examiner.*

HAROLD BURSTEIN, *Assistant Examiner.*

M. C. JACOBS, *Assistant Examiner.*